No. 637,780. Patented Nov. 28, 1899.
W. H. HANNA.
UDDER PROTECTOR.
(Application filed Feb. 27, 1899.)
(No Model.)
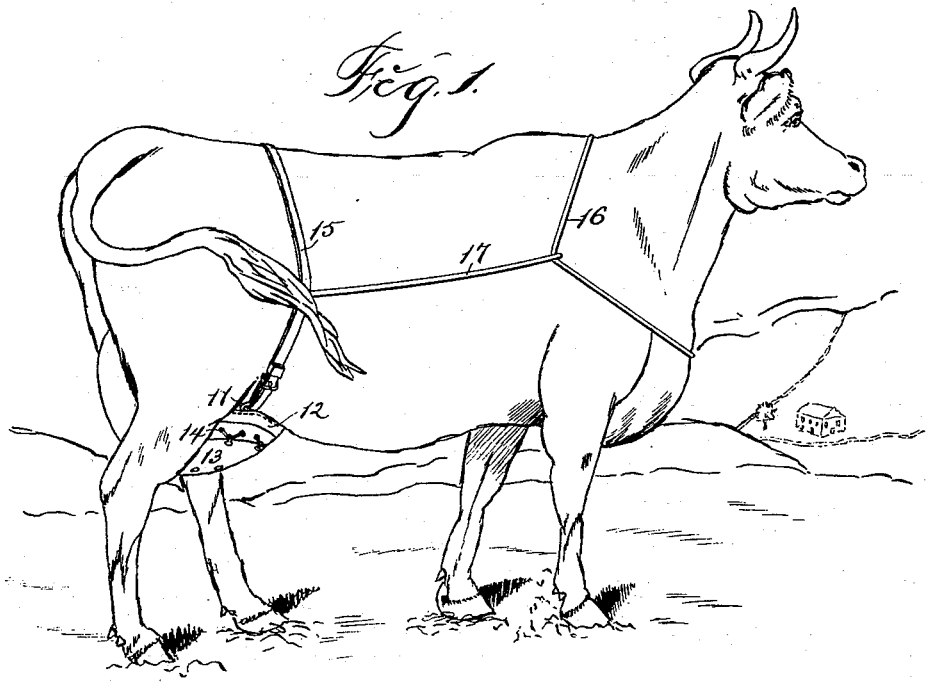
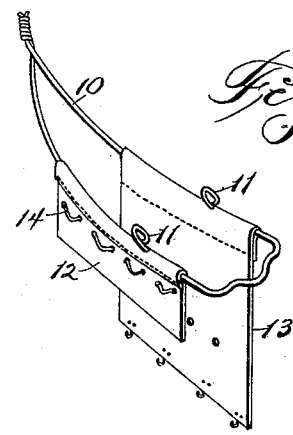
Attest:
R. G. Orwig
J. C. Pate.
Inventor,
William H. Hanna
By J. C. Sweet
Atty

UNITED STATES PATENT OFFICE.

WILLIAM H. HANNA, OF MONTEVIDEO, MINNESOTA.

UDDER-PROTECTOR.

SPECIFICATION forming part of Letters Patent No. 637,780, dated November 28, 1899.

Application filed February 27, 1899. Serial No. 707,122. (No model.)

*To all whom it may concern:*

Be it known that I, WILLIAM H. HANNA, a citizen of the United States of America, and a resident of Montevideo, Chippewa county, Minnesota, have invented certain new and useful Improvements in Udder-Protectors, of which the following is a specification.

The object of this invention is to provide improved means for covering and protecting the udder of a cow from soil, frost, insects, dogs, and other annoying and objectionable influences that might cause injury to the udder or teats thereof from suckling by herself or other animals.

My invention consists of a rigid frame, a harness for securing said frame to a cow, and a laced bag permanently mounted on the frame and arranged and shaped to support and inclose the udder.

My invention consists, further, in the construction, arrangement, and combination of elements hereinafter set forth, pointed out in my claims, and illustrated by the accompanying drawings, in which—

Figure 1 is a perspective showing my improved device mounted as required for practical use. Fig. 2 is a perspective showing my device open and detached from the harness.

In the construction of the device as shown the numeral 10 designates a rigid metallic frame, preferably made of one piece of heavy wire or small rod bent into the form of a triangle and connected at its ends by twisting, as shown. The side portions of the frame are provided with eyes or loops 11 11, formed therein, and the transverse or connecting portion of the frame, between the corners thereof, is curved downwardly, as shown in Fig. 2, to avoid the lacteal duct. Flaps 12 13 are fixed at their upper margins to the side portions of the frame 10 and depend therefrom. The flap 13 is longer than the flap 12, and said flap 12 is provided with eyelets to receive a lace 14, adjustable as to length therein. The lower margin of the flap 13 is provided with hooks to detachably engage the lace 14 or may be otherwise connected thereto, as desired. A girth 15 connects at its ends with the eyes or loops 11 11 and extends over the back of the cow, as shown in Fig. 1. A small rope or cord 16 is mounted on and around the neck of the cow and is connected on either side by means of ropes or cords 17 to the girth 15 on either side of the cow.

The device is sustained by the strain of the girth 15 balancing against the engagement of the transverse portion of the frame, connecting and between the sides thereof, on the under side of the cow's belly in front of the udder.

The device may be opened by releasing the hooks from the lace and permitting the flaps to depend to provide access to the udder for milking, the flap 13 shielding the flowing milk against deflection by air-currents.

When in place as shown the device fully and completely covers and protects the teats and lower part of the udder, keeps the udder clean, and provides an effective calf-weaner, inasmuch as it restrains the calf from suckling.

This device may be used advantageously as a bandage or support for a poultice or local application of remedial agencies to the udder.

In use the flaps fold and confine the teats close to the udder, in which position the teats cannot be seized by a calf or other animal or the cow and suckled. In such position and covered by the textile flaps the teats are protected from frost or scratching by barbed wire, brush, or other objects.

I claim as my invention—

1. The udder-protector comprising the rigid frame, the harness for supporting said frame, the flaps 12, 13 fixed to and depending from said frame, one of which flaps is provided with eyelets and a lace therein, the other flap being provided with hooks to engage said lace.

2. The udder-protector comprising the rigid frame formed with loops 11, 11 on its side portions, a girth 15, engaging said loops and arranged to extend over the back of a cow, a neck-band 16, cords 17 connecting the neck-band and girth and flaps fixed to and depending from said frame, which flaps are perforated to receive the loops 11, 11 and provided with means for lacing one flap to the other.

3. The udder-protector comprising the frame, means for supporting said frame on a cow, flaps fixed to and depending from said frame, which flaps are of unequal length, the shorter flap being provided with eyelets and a lace therein, the longer flap being provided with hooks to engage said lace.

Signed by me at Des Moines, Iowa, this 10th day of August, 1898.

WILLIAM H. HANNA.

Witnesses:
WILLIAM W. WALLACE,
SILAS C. SWEET.